(12) United States Patent
Koh et al.

(10) Patent No.: US 12,253,101 B2
(45) Date of Patent: Mar. 18, 2025

(54) SELF-DRILLING EXPANDING ANCHOR BOLT

(71) Applicant: Hilti Aktiengesellschaft, Schaan (LI)

(72) Inventors: Gaisheng Koh, Shanghai (CN); Liang Lu, ZJ (CN); Linda Xu, Shanghai (CN)

(73) Assignee: Hilti Aktiengesellschaft, Schaan (LI)

( * ) Notice: Subject to any disclaimer, the term of this patent is extended or adjusted under 35 U.S.C. 154(b) by 182 days.

(21) Appl. No.: 18/009,627

(22) PCT Filed: Jun. 16, 2021

(86) PCT No.: PCT/EP2021/066245
§ 371 (c)(1),
(2) Date: Dec. 9, 2022

(87) PCT Pub. No.: WO2022/002592
PCT Pub. Date: Jan. 6, 2022

(65) Prior Publication Data
US 2023/0220863 A1    Jul. 13, 2023

(30) Foreign Application Priority Data
Jun. 30, 2020 (CN) .......................... 202010614658.7

(51) Int. Cl.
*F16B 13/06* (2006.01)
*F16B 13/00* (2006.01)

(52) U.S. Cl.
CPC .......... *F16B 13/065* (2013.01); *F16B 13/002* (2013.01)

(58) Field of Classification Search
CPC .............................. F16B 13/002; F16B 13/065
(Continued)

(56) References Cited

U.S. PATENT DOCUMENTS

| 1,342,201 A * | 6/1920 | Beckwith | F16B 19/083 |
| | | | 29/512 |
| 4,990,042 A * | 2/1991 | Szayer | F16B 19/083 |
| | | | 470/11 |

(Continued)

FOREIGN PATENT DOCUMENTS

| CN | 101158368 A | 4/2008 |
| CN | 101802420 A | 8/2010 |

(Continued)

OTHER PUBLICATIONS

International Search Report of PCT/EP2021/066245 dated Jun. 16, 2021.

*Primary Examiner* — Gary W Estremsky
(74) *Attorney, Agent, or Firm* — Davidson Kappel LLC

(57) ABSTRACT

A self-drilling expanding anchor bolt, including a drill bit for drilling, an anchor rod connected to the drill bit, and an expanding sleeve surrounding the anchor rod, the anchor rod having an expansion cone at a first end adjoining the drill bit, having a neck region behind and contiguous with the expansion cone, and having a threaded segment at a second end of the neck region remote from the drill bit, wherein the expansion cone expands the expanding sleeve in a radial direction when the expansion cone is pulled into the expanding sleeve; a transition part is provided between the drill bit and the expansion cone of the anchor rod, the maximum diameter of the transition part being smaller than the hole diameter of a drilled hole formed by the drill bit.

14 Claims, 3 Drawing Sheets

(58) Field of Classification Search
USPC .......................................... 411/44, 29, 60.2
See application file for complete search history.

(56) References Cited

U.S. PATENT DOCUMENTS

| | | | | |
|---|---|---|---|---|
| 4,998,853 | A * | 3/1991 | Shinjo | B21H 7/002 |
| | | | | 411/29 |
| 7,322,783 | B2 * | 1/2008 | Pearce | B21J 15/34 |
| | | | | 411/501 |
| 2006/0275097 | A1 * | 12/2006 | Loi | F16B 19/1054 |
| | | | | 411/29 |
| 2008/0008553 | A1 * | 1/2008 | Gillis | F16B 13/065 |
| | | | | 405/259.4 |
| 2009/0092458 | A1 | 4/2009 | Moroney et al. | |
| 2011/0027045 | A1 * | 2/2011 | Hazut | F16B 25/103 |
| | | | | 411/387.2 |

FOREIGN PATENT DOCUMENTS

| | | |
|---|---|---|
| CN | 201953767 U | 8/2011 |
| CN | 204003873 U | 12/2014 |
| DE | 102018208255 A1 | 11/2019 |
| WO | WO 9749929 A1 | 12/1997 |
| WO | WO2008041836 A1 | 4/2008 |

* cited by examiner

SELF-DRILLING EXPANDING ANCHOR BOLT

FIELD OF THE INVENTION

The present invention relates to an anchor bolt for use in construction projects, in particular to an expanding anchor bolt having a self-drilling function.

BACKGROUND

Existing self-drilling anchor bolts are generally used in the ore mining industry; the anchor bolts have a huge volume, and drill bits used for drilling are generally made of a relatively hard material. Anchoring members used for fixing and connecting concrete, stone, wood, etc. in the construction industry generally lack a self-drilling function. Most commonly, a base material has a pre-formed drilled hole, and an expanding anchor bolt is then inserted; a sleeve of high strength with a longitudinal slit surrounds a rod body of the expanding anchor bolt, the sleeve being highly elastic due to having a slit structure; the sleeve is pressed into the drilled hole, and a friction fit is formed between a surface of the sleeve and an inner surface of the drilled hole, thereby fixing the rod body in the drilled hole by means of friction. However, this requires another drilling tool and step. Thus, expanding anchor bolts having a self-drilling function are also beginning to be used in the construction industry.

For example, WO9749929A has disclosed a self-drilling anchor bolt 10, comprising a bolt 12 locally having a thread, and being accommodated in a sleeve 11 which locally has a slit, one end of the bolt 12 having a thickened part 13 extending from the sleeve 11. The thickened part 13 of the bolt is connected to a drill bit 16 for drilling. The diameter of the drill bit 16 is at least as wide as the sleeve 11. When the bolt is pulled outwards, the thickened part 13 is pulled into the sleeve 11, thereby fixing the anchor bolt 10 in the hole drilled by the drill bit 16.

SUMMARY OF THE INVENTION

However, in the self-drilling anchor bolt disclosed in the above-mentioned patent, in the process of the bolt 12 being pulled outwards by tightening a nut 15, the sleeve 11 slides along the conical thickened part 13, and since the diameters of the drill bit 16 and the thickened part 13 are slightly larger than the diameter of the sleeve 11, the sleeve 11 will abut a hole wall before reaching the junction of the thickened part 13 and the drill bit 16. Consequently, if the material forming the hole wall is of low strength, the entire anchor bolt 10 will be pulled out of the hole, whereas if the material forming the hole wall is of very high strength, a front end of the sleeve abuts the hole wall obliquely and is unable to form a good friction fit with the hole wall, such that the fastening tension that the anchor bolt is able to bear is greatly reduced.

Thus, we desire a self-drilling expanding anchor bolt having a higher load force and giving a reliable anchoring result.

The present invention provides a self-drilling expanding anchor bolt, wherein an expanding sleeve thereof forms a good friction fit with a hole wall in a self-drilled hole formed by a drill bit thereof, thus giving a high-load, stable anchoring result.

A self-drilling expanding anchor bolt comprises a drill bit for drilling, an anchor rod connected to the drill bit, and an expanding sleeve surrounding the anchor rod, the anchor rod having an expansion cone at a first end adjoining the drill bit, having a neck region behind and contiguous with the expansion cone, and having a threaded segment at a second end of the neck region remote from the drill bit, wherein the expansion cone expands the expanding sleeve in a radial direction when the expansion cone is pulled into the expanding sleeve; a transition part is provided between the drill bit and the expansion cone of the anchor rod, the maximum diameter of the transition part being smaller than the hole diameter of a drilled hole formed by the drill bit.

With the transition part being provided between the drill bit and the expansion cone of the anchor rod, and the maximum diameter of the transition part being smaller than the maximum diameter of the drilled hole, i.e. a gap being present between the anchor bolt and a hole wall in a region of the transition part, in the process of anchoring, when the expansion cone of the anchor rod is pulled into the expanding sleeve, the expanding sleeve slides past the expansion cone and enters the gap between the transition part and the hole wall; thus, the expanding sleeve forms a good friction fit with the hole wall and the transition part, greatly improving the anchoring result afforded by the anchor bolt.

According to a preferred embodiment of the present invention, the transition part is substantially cylindrical. The cylindrical transition part is simple to machine, and can also provide a uniform anchoring force.

According to another preferred embodiment of the present invention, the transition part substantially has a truncated cone shape, with a sloping surface of the truncated cone shape expanding from the expansion cone of the anchor rod towards the drill bit. Preferably, a cone angle of the transition part is smaller than a cone angle of the expansion cone. More preferably, the cone angle of the transition part is 0-5 degrees. The transition part with the truncated cone shape is more favorable for guiding the expanding sleeve into the gap between the transition part and the hole wall; at the same time, the fact that the cone angle of the transition part is smaller than the cone angle of the expansion cone ensures that the expanding sleeve will not extend into the hole wall along the expansion cone, but instead will gradually enter the gap between the transition part and the hole wall until it covers the entire transition part; consequently, the self-drilling anchor bolt of the present invention gives a better anchoring result, and can bear a higher load.

According to another preferred embodiment of the present invention, the difference between the hole diameter of the drilled hole formed by the drill bit and the maximum diameter of the transition part is no greater than the thickness of the expanding sleeve. The difference between the hole diameter of the drilled hole formed by the drill bit and the maximum diameter of the transition part is the gap between the hole wall and the transition part, and this gap cannot be too large; too large a gap would result in the expanding sleeve being unable to form a close fit with the hole wall, and even less able to form a good friction fit with the hole wall. However, this gap cannot be too small either; too small a gap would result in the expanding sleeve being unable to enter the gap. Essentially, the difference between the hole diameter of the drilled hole formed by the drill bit and the maximum diameter of the transition part depends on the thickness of the expanding sleeve, and cannot be greater than the thickness of the expanding sleeve, preferably being equal to or slightly less than the thickness of the expanding sleeve, such that an interference fit is formed among the anchor bolt, expanding sleeve and hole wall, and the anchoring result afforded by the self-drilling anchor bolt of the present invention is improved.

More preferably, a chamfer is provided at the junction of the drill bit and the transition part to avoid stress concentration.

According to a preferred embodiment of the present invention, the height of the transition part is less than the height of the drill bit. More preferably, the height of the transition part is ⅕-½ of the height of the drill bit. The height of the transition part may be adjusted according to the embedment depth of the anchor bolt and the required tightening torque. Generally, a transition part height that is less than the drill bit height and within the range of ⅕-½ is sufficient to meet the demands of application operating conditions of the self-drilling anchor bolt, and at the same time, the anchor bolt has a compact structure, material is saved, and performance is stable.

BRIEF DESCRIPTION OF THE FIGURES

The embodiments mentioned can be better understood through the following detailed description while perusing the accompanying drawings. It is emphasized that the various components are not necessarily drawn to scale. In fact, dimensions can be enlarged or reduced at will for the purposes of clear discussion. In the drawings, identical reference labels denote identical elements.

DETAILED DESCRIPTION

The self-drilling expanding anchor bolt according to the present invention is described below with reference to FIGS. 1-5.

Figure 1:
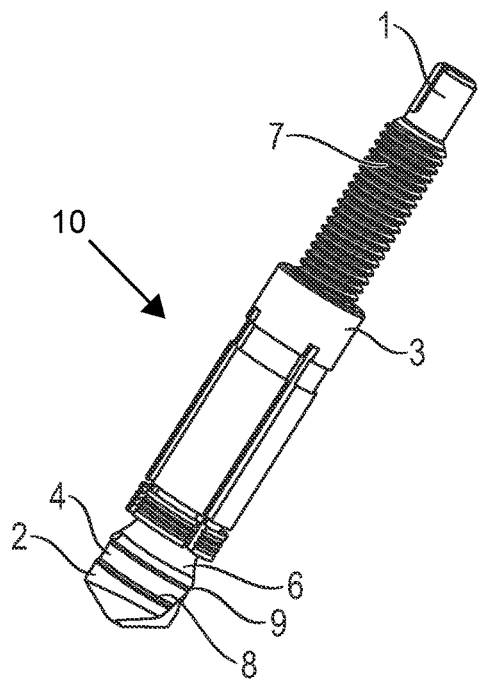
FIG. 1 is a schematic drawing of the self-drilling expanding anchor bolt of the present invention.

In a schematic embodiment of the present invention, as shown in FIG. 1, the self-drilling expanding anchor bolt 10 comprises a drill bit 2 for drilling, an anchor rod 1 connected to the drill bit, a transition part 4 being provided between the drill bit 2 and an expansion cone 6 of the anchor rod 1, and an expanding sleeve 3 surrounding the anchor rod.

The drill bit 2 has a blade part for drilling. The shape and size of the drill bit may be any shape or size suitable for producing a hole of the desired shape and diameter. In the present invention, the drill bit may be made of any material used for suitable ground, e.g. low-carbon steel, high-carbon steel, high-speed steel, cobalt steel, tungsten carbide, polycrystalline diamond, or any other suitable material. In addition, the drill bit may be coated with a coating which increases the strength or wear resistance of the drill bit, e.g. black oxide, titanium nitride (TiN), titanium aluminium nitride (TiAN), titanium carbon nitride (TiCN), diamond powder, zirconium nitride, or any other material capable of providing the required characteristics. According to a preferred embodiment of the present invention, the drill bit 2, transition part 4 and anchor rod 1 are integrally formed; the drill bit 2 may also be of the same material as the anchor rod 1.

Figure 2:
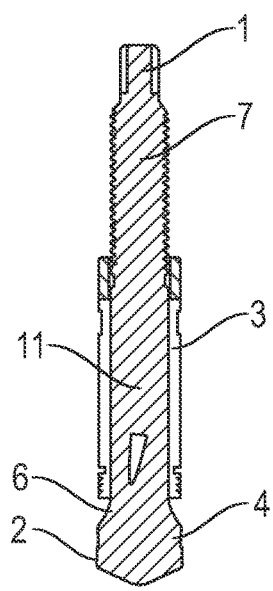
FIG. 2 is a sectional view, along a centre line, of the self-drilling expanding anchor bolt of the present invention.

As shown in FIG. 2, the anchor rod 1 has the expansion cone 6 at a first end adjoining the drill bit, has a neck region 11 behind and contiguous with the expansion cone, and has a threaded segment 7 at a second end of the neck region remote from the drill bit. In the neck region 11, the anchor rod 1 has a substantially constant cylindrical cross section. On the expansion cone 6, the anchor rod 1 expands from the neck region 11 towards the first end at the front of the anchor rod; the maximum diameter of the expansion cone 6 is at the first end of the anchor rod, the minimum diameter is at the boundary with the neck region 11, and the minimum diameter of the expansion cone 6 is substantially equal to the diameter of the neck region 11. A surface of the expansion cone 6 is formed to be of a frustum shape; however, the frustum shape here is not a frustum shape in the strict mathematical sense; as will be understood, the sloping surface shape of the expansion cone 6 may have the shape of a straight line, but may also have the shape of a gradually expanding arc. On that side of the neck region 11 which is remote from the expansion cone 6, in a region of a rear end of the anchor rod 1, the threaded segment 7 for introducing tension into the anchor rod 1 is provided; according to an embodiment of the present invention, the threaded segment 7 is an external thread, and a nut can be mounted on the externally threaded segment 7. As will be understood, the threaded segment 7 may also be an internal thread in a rear end region of the anchor rod 1, fitted to a bolt to form a load.

The expanding sleeve 3 surrounds the anchor rod 1 annularly; the expanding sleeve 3 substantially extends in an axial direction from the junction of the expansion cone 6 and neck region to the threaded segment 7. When the expansion cone 6 is pulled into the expanding sleeve 3, the expansion cone 6 expands the expanding sleeve 3 in a radial direction; the inner diameter of the expanding sleeve 3 is slightly larger than the outer diameter of the neck region 11.

The transition part 4 is provided between the drill bit 2 and the expansion cone 6 of the anchor rod. The transition part 4 extends from the first end of the anchor rod to the drill bit. According to a preferred embodiment of the present invention, the transition part 4 is cylindrical; that is to say, the maximum diameter of the transition part 4 is the diameter of a cylinder, and is substantially equal to or slightly larger than the maximum diameter of the expansion cone. The maximum diameter of the transition part 4 is less than the hole diameter of a drilled hole formed by the drill bit.

Figure 5:
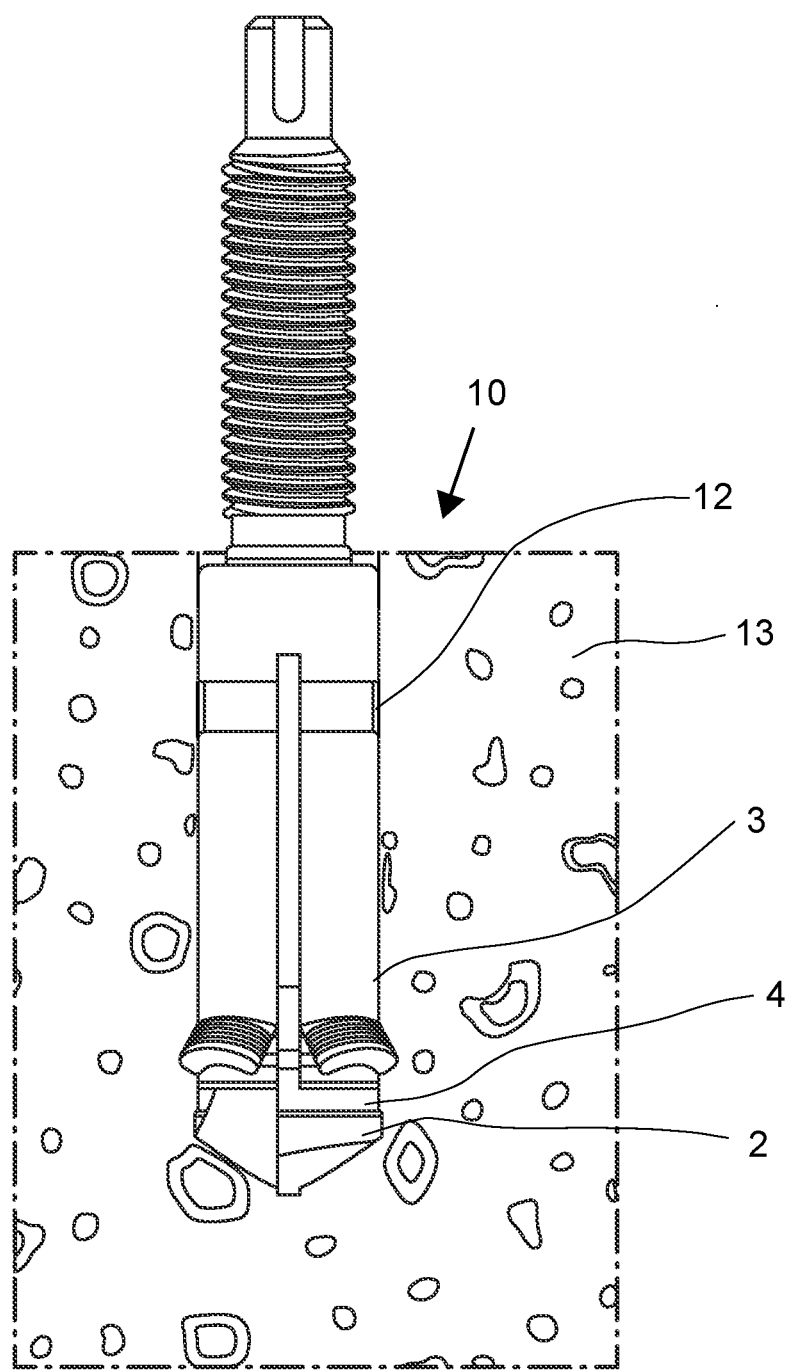
FIG. 5 is a schematic drawing of the state in which the self-drilling expanding anchor bolt of the present invention is installed.

As shown in FIGS. 1 and 5, in the process of installing the self-drilling anchor bolt 10, the drill bit 2 is driven by means of an installation tool to drill a hole in the material of a substrate 13, thus forming a drilled hole 12; the hole diameter of the drilled hole 12 is determined by the size of the drill bit. When drilling is complete, the self-drilling anchor bolt simply remains in the drilled hole 12. Thereafter, the expanding sleeve 3 is hammered in the direction of a longitudinal axis of the anchor bolt by the installation tool; the expanding sleeve 3 moves towards the expansion cone, and a front end region of the expanding sleeve 3 begins to radially expand along the expansion cone. Then, by tightening the nut, a segment of the anchor rod 1 is pulled out of the drilled hole 12 in a pull-out direction extending parallel to the longitudinal axis. Due to friction between the expanding sleeve 3 and a substantially cylindrical hole wall of the drilled hole 12, the expanding sleeve 3 is held in the drilled hole 12 at this time, such that the anchor rod 1 moves relative to the expanding sleeve 3. In the course of this movement, the sloping surface of the expansion cone 6 of the anchor rod 1 moves ever deeper into (is pressed into) the expanding sleeve 3. When the expansion cone 6 has completely entered the expanding sleeve 3, since the transition part 4 with maximum diameter smaller than the hole diameter is further provided between the expansion cone 6 and drill bit 2 in the present invention, there is still a little gap between the transition part 4 and the hole wall of the drilled hole 12. When the nut continues to be tightened, thus continuing to pull the anchor rod 1 out of the drilled hole 12 in the pull-out direction extending parallel to the longitudinal axis, a front end region of the expanding sleeve 3 will enter the gap between the transition part 4 and the hole wall, and be pressed against the hole wall of the drilled hole 12. Thus, the radial expansion of the expanding sleeve 3 will not cause damage to the hole wall, but forms a close fit with the hole wall, to give effective fixing by friction; the expanding anchor bolt 1 is fixed in the substrate 13 by this mechanism. FIG. 5 shows the state in which the self-drilling anchor bolt 10 is installed; in this state, the expanding anchor bolt is fixed in the substrate 13. The nut can be used to fix the installation member on the substrate.

Due to the presence of the transition part 4, the expanding sleeve 3 is accurately guided to the desired position in the process of radial expansion, and is suitable for substrate materials of different hardnesses. When the material of the substrate 13 is of weak strength, a front end region of the expanding sleeve 3 is pressed and extends into the substrate material at the position of the maximum diameter of the expansion cone. The difference between the hole diameter of the drilled hole 12 formed by the drill bit 2 and the maximum diameter of the transition part 4 is no greater than the thickness of the expanding sleeve. The transition part 4 and drill bit 1 are still securely surrounded by the expanding sleeve, and will not be pulled out of the expanding sleeve by tension applied axially outwards.

Figure 3:
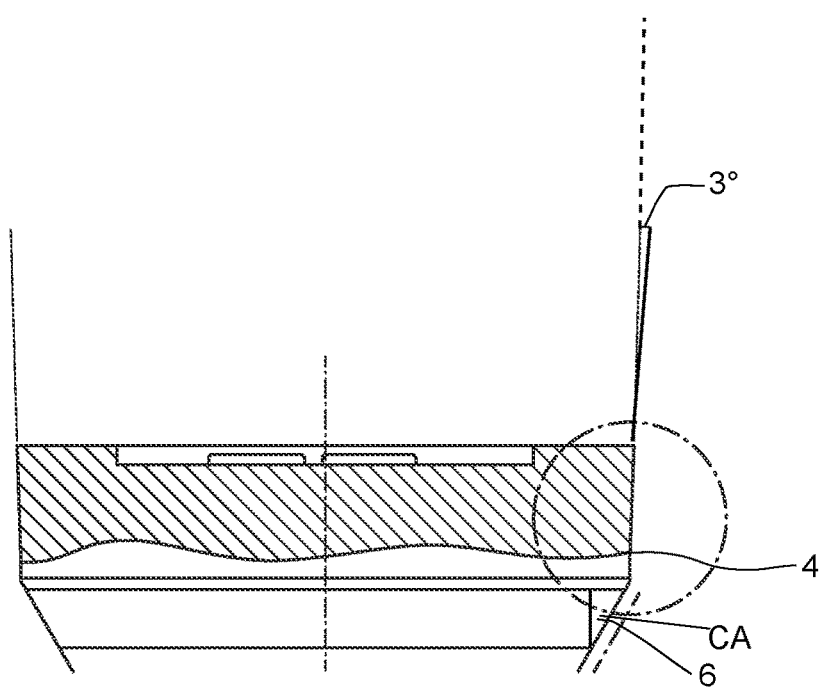
FIG. 3 is a partial schematic drawing of an embodiment of the self-drilling expanding anchor bolt of the present invention.

As shown in FIG. 3 schematically, according to another preferred embodiment of the present invention, the transition part 4 has a truncated cone shape (shown for clarity without the drill bit attached); a sloping surface of the truncated cone shape expands from the expansion cone 6 of the anchor rod towards the drill bit along the longitudinal axis. Preferably, as shown in FIG. 3, a cone angle of the transition part 4 is smaller than a cone angle CA of the expansion cone 6; that is to say, the angle of inclination of the sloping surface of the transition part 4 relative to the longitudinal axis is smaller than the angle of inclination of the side sloping surface of the expansion cone 6 relative to the longitudinal axis. More preferably, the cone angle of the transition part 4 is 0-5 degrees; in a preferred embodiment of the present invention, the cone angle is approximately 3 degrees. The transition part 4 with the truncated cone shape is more favorable for guiding the expanding sleeve 3 into the gap between the transition part 4 and the hole wall; at the same time, the fact that the cone angle of the transition part 4 is smaller than the cone angle of the expansion cone 6 ensures that the expanding sleeve 3 will not extend into the hole wall of the drilled hole 12 along the expansion cone 6, but instead will gradually enter the gap between the transition part and the hole wall until it covers the entire transition part; consequently, the self-drilling anchor bolt of the present invention gives a better anchoring result, and can bear a higher load.

Figure 4:
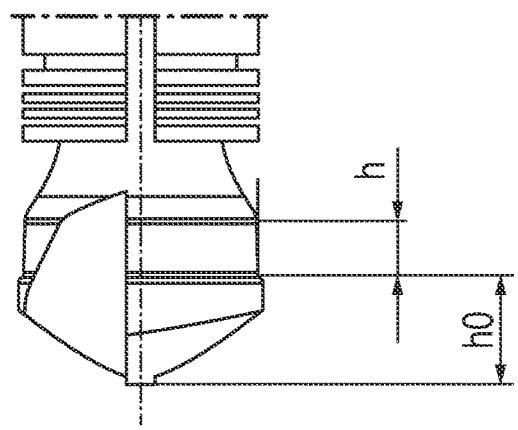
FIG. 4 shows a partial schematic drawing of another embodiment of the self-drilling expanding anchor bolt of the present invention.

Preferably, a chamfer is provided at the junction of the drill bit and the transition part, thereby avoiding stress concentration at the junction. Furthermore, according to a preferred embodiment of the present invention, as shown in FIG. 4, the height h of the transition part is less than the height h0 of the drill bit. More preferably, the height h of the transition part is ⅕-½ of the height h0 of the drill bit. The height of the transition part may be adjusted according to the embedment depth of the anchor bolt and the required tightening torque. Generally, a transition part height that is less than the drill bit height and within the range of ⅕-½ is sufficient to meet the demands of application operating conditions of the self-drilling anchor bolt, and at the same time, the anchor bolt has a compact structure, material is saved, and performance is stable.

As stated above, although demonstrative embodiments of the present invention have already been explained herein with reference to the accompanying drawings, the present invention is not limited to the particular embodiments described above; many other embodiments are possible, and the scope of the present invention should be defined by the claims and their equivalent meaning.

What is claimed is:

1. A self-drilling expanding anchor bolt and a drilled hole, comprising:
a drill bit for drilling;
an anchor rod connected to the drill bit;
an expanding sleeve surrounding the anchor rod, the anchor rod having an expansion cone at a first end adjoining the drill bit, having a neck region behind and contiguous with the expansion cone, and having a threaded segment at a second end of the neck region remote from the drill bit, the expansion cone expanding the expanding sleeve in a radial direction when the expansion cone is pulled into the expanding sleeve; and
a transition part between the drill bit and the expansion cone of the anchor rod, a maximum diameter of the transition part being smaller than a diameter of the drill bit;
wherein the transition part has a truncated cone shape, with a sloping surface of the truncated cone shape expanding from the expansion cone of the anchor rod towards the drill bit.

2. The self-drilling expanding anchor bolt as recited in claim 1 wherein the transition part is cylindrical.

3. The self-drilling expanding anchor bolt as recited in claim 1 wherein a cone angle of the transition part is smaller than a cone angle of the expansion cone.

4. The self-drilling expanding anchor bolt as recited in claim 3 wherein the cone angle of the transition part is 0 to 5 degrees.

5. The self-drilling expanding anchor bolt as recited in claim 1 wherein a difference between the diameter the drill bit and the maximum diameter of the transition part is no greater than a thickness of the expanding sleeve.

6. The self-drilling expanding anchor bolt as recited in claim 1 further comprising a chamfer at the junction of the drill bit and the transition part.

7. The self-drilling expanding anchor bolt as recited in claim 6 wherein the chamfer is arc-shaped.

8. The self-drilling expanding anchor bolt as recited in claim 1 wherein a height of the transition part is less than a height of the drill bit.

9. The self-drilling expanding anchor bolt as recited in claim 8 wherein the height of the transition part is ⅕ to ½ of the height of the drill bit.

10. A self-drilling expanding anchor bolt and a drilled hole, comprising:
a drill bit for drilling;
an anchor rod connected to the drill bit;
an expanding sleeve surrounding the anchor rod, the anchor rod having an expansion cone at a first end adjoining the drill bit, having a neck region behind and contiguous with the expansion cone, and having a threaded segment at a second end of the neck region remote from the drill bit, the expansion cone expanding the expanding sleeve in a radial direction when the expansion cone is pulled into the expanding sleeve; and a transition part between the drill bit and the expansion cone of the anchor rod, a maximum diameter of the transition part being smaller than a diameter the drill bit;

wherein a difference between the diameter the drill bit and the maximum diameter of the transition part is no greater than a thickness of the expanding sleeve.

11. A self-drilling expanding anchor bolt and a drilled hole, comprising:

a drill bit for drilling;

an anchor rod connected to the drill bit;

an expanding sleeve surrounding the anchor rod, the anchor rod having an expansion cone at a first end adjoining the drill bit, having a neck region behind and contiguous with the expansion cone, and having a threaded segment at a second end of the neck region remote from the drill bit, the expansion cone expanding the expanding sleeve in a radial direction when the expansion cone is pulled into the expanding sleeve;

a transition part between the drill bit and the expansion cone of the anchor rod, a maximum diameter of the transition part being smaller than a diameter the drill bit; and a chamfer at the junction of the drill bit and the transition part.

12. The self-drilling expanding anchor bolt as recited in claim 11 wherein the chamfer is arc-shaped.

13. A self-drilling expanding anchor bolt and a drilled hole, comprising:

a drill bit for drilling;

an anchor rod connected to the drill bit;

an expanding sleeve surrounding the anchor rod, the anchor rod having an expansion cone at a first end adjoining the drill bit, having a neck region behind and contiguous with the expansion cone, and having a threaded segment at a second end of the neck region remote from the drill bit, the expansion cone expanding the expanding sleeve in a radial direction when the expansion cone is pulled into the expanding sleeve; and a transition part between the drill bit and the expansion cone of the anchor rod, a maximum diameter of the transition part being smaller than a diameter the drill bit;

wherein a height of the transition part is less than a height of the drill bit.

14. The self-drilling expanding anchor bolt as recited in claim 13 wherein the height of the transition part is $\frac{1}{5}$ to $\frac{1}{2}$ of the height of the drill bit.

* * * * *